(12) United States Patent
Biswas et al.

(10) Patent No.: US 10,404,806 B2
(45) Date of Patent: Sep. 3, 2019

(54) METHODS AND SYSTEMS FOR SEGMENTING MULTIMEDIA CONTENT

(71) Applicant: YEN4KEN, INC., Princeton, NJ (US)

(72) Inventors: Arijit Biswas, Kolkata (IN); Ankit Gandhi, Raipur (IN); Ranjeet Kumar, Bangalore (IN); Om D Deshmukh, Bangalore (IN)

( * ) Notice: Subject to any disclaimer, the term of this patent is extended or adjusted under 35 U.S.C. 154(b) by 1037 days.

(21) Appl. No.: 14/841,760

(22) Filed: Sep. 1, 2015

(65) Prior Publication Data

US 2017/0063954 A1 Mar. 2, 2017

(51) Int. Cl.
G06F 15/16 (2006.01)
H04L 29/08 (2006.01)
H04L 29/06 (2006.01)

(52) U.S. Cl.
CPC .......... H04L 67/142 (2013.01); H04L 65/602 (2013.01)

(58) Field of Classification Search
CPC .......................... H04L 65/602; H04L 67/142
See application file for complete search history.

(56) References Cited

U.S. PATENT DOCUMENTS

| | | | |
|---|---|---|---|
| 5,708,825 A | 1/1998 | Sotomayor | |
| 7,349,477 B2 | 3/2008 | Divakaran et al. | |
| 8,359,550 B2 | 1/2013 | Meyer et al. | |
| 8,423,555 B2 | 4/2013 | Ambwani et al. | |
| 8,670,978 B2 | 3/2014 | Nagatomo | |
| 9,384,389 B1* | 7/2016 | Sankaranarayanan | G06K 9/00456 |
| 9,888,279 B2* | 2/2018 | Ishtiaq | H04N 21/23418 |
| 2005/0010412 A1* | 1/2005 | Aronowitz | G10L 15/02 704/254 |
| 2007/0088844 A1* | 4/2007 | Seims | H04L 29/06027 709/231 |
| 2007/0219945 A1* | 9/2007 | Wang | G06F 17/272 |
| 2008/0066136 A1 | 3/2008 | Dorai et al. | |

(Continued)

OTHER PUBLICATIONS

U.S. Appl. No. 14/798,499, filed Jul. 14, 2015; Methods and Systems for Indexing Multimedia Content; Biswas et al.

(Continued)

*Primary Examiner* — Tonia L Dollinger
*Assistant Examiner* — Dixon F Dabipi
(74) *Attorney, Agent, or Firm* — LeonardPatel PC; Sheetal S. Patel; Michael A. Leonard

(57) ABSTRACT

A method and a system are provided for segmenting a multimedia content. The method estimates a count of a plurality of multimedia segments in the multimedia content, and a duration of each of the plurality of multimedia segments in the multimedia content. The method determines a cost function associated with a multimedia segment from the plurality of multimedia segments, based on the count of the plurality of multimedia segments, and the duration of each of the plurality of multimedia segments. The method further determines an updated count of the plurality of multimedia segments, and an updated duration of each of the plurality of multimedia segments until the cost function satisfies a pre-defined criteria. Based on the updated count of the plurality of multimedia segments, and the updated duration of each of the plurality of multimedia segments, the method segments the multimedia content into the plurality of multimedia segments.

18 Claims, 7 Drawing Sheets

(56) References Cited

U.S. PATENT DOCUMENTS

| | | | |
|---|---|---|---|
| 2009/0154567 A1* | 6/2009 | Lei | H04N 19/46 375/240.24 |
| 2010/0009655 A1* | 1/2010 | Ding | H04M 1/72552 455/406 |
| 2012/0011109 A1 | 1/2012 | Ambwani et al. | |
| 2013/0036124 A1* | 2/2013 | Ambwani | G06F 17/30796 707/749 |
| 2015/0189343 A1* | 7/2015 | Lee | H04N 21/25435 725/1 |
| 2017/0147544 A1* | 5/2017 | Modani | G06F 17/24 |

OTHER PUBLICATIONS

U.S. Appl. No. 14/523,966, filed Oct. 27, 2014; Methods and Systems for Processing a Multimedia Content; Yadav et al.

D. M. Blei. Probabilistic topic models. Commun. ACM, 55(4):77-84, 2012.

S. Brin and L. Page. The anatomy of a large-scale hypertextual Web search engine. Computer Networks and ISDN Systems, 30(1-7):107-117, 1998.

X. Ji and H. Zha. Domain-independent text segmentation using anisotropic diffusion and dynamic programming. In SIGIR, pp. 322-329. ACM, 2003.

R. Mihalcea and P. Tarau. Textrank: Bringing order into text. In EMNLP, pp. 404-411.ACL, 2004.

M. F. Porter. An algorithm for suffix stripping. Program, 14(3):130-137, 1980.

* cited by examiner

METHODS AND SYSTEMS FOR SEGMENTING MULTIMEDIA CONTENT

TECHNICAL FIELD

The presently disclosed embodiments are related, in general, to multimedia content processing. More particularly, the presently disclosed embodiments are related to methods and systems for segmenting a multimedia content.

BACKGROUND

Advancements in the field of education have led to the usage of Massive Open Online Courses (MOCCs) as one of the popular modes of learning. Educational organizations, provide multimedia content in the form of video lectures, and/or audio lectures to students for learning. Such multimedia content may contain a plurality of topics that are discussed over a duration of the multimedia content.

Usually, the duration of such multimedia content (e.g., educational multimedia content) may be long compared with the duration of non-educational multimedia content. A student accessing the multimedia content may be interested in at least one topic discussed in the multimedia content. To access the portion of the multimedia content that corresponds to the at least one topic, the student may have to navigate back and forth within the multimedia content. The process to navigate back and forth within the multimedia content, and identifying the at least one topic, may be a cumbersome process.

Further limitations and disadvantages of conventional and traditional approaches will become apparent to those skilled in the art, through a comparison of described systems with some aspects of the present disclosure, as set forth in the remainder of the present application and with reference to the drawings.

SUMMARY

According to embodiments illustrated herein, there may be provided a method for segmenting a multimedia content. The method may estimate a count of a plurality of multimedia segments in the multimedia content, and a duration of each of the plurality of multimedia segments in the multimedia content. The method may further determine a cost function associated with a multimedia segment from the plurality of multimedia segments, based on the count of the plurality of multimedia segments in the multimedia content, and the duration of each of the plurality of multimedia segments in the multimedia content. Further, the cost function may be determined based on a first score, and a second score. In an embodiment, the first score may be indicative of a degree of similarity between one or more consecutive multimedia segments of the plurality of multimedia segments. In an embodiment, the first score may be determined based on a set of similar keywords in the one or more consecutive multimedia segments. In an embodiment, the second score may be indicative of a degree of dissimilarity between the one or more consecutive multimedia segments of the plurality of multimedia segments. In an embodiment, the second score is determined based on a set of dissimilar keywords in the one or more consecutive multimedia segments. The method may further determine an updated count of the plurality of multimedia segments, and an updated duration of each of the plurality of multimedia segments until the cost function satisfies a pre-defined criteria. Based on the updated count of the plurality of multimedia segments, and the updated duration of each of the plurality of multimedia segments, the method may segment the multimedia content into the plurality of multimedia segments.

According to embodiments illustrated herein, there may be provided a system that comprises a multimedia content server configured to segment a multimedia content. The multimedia content server may further comprise one or more processors configured to estimate a count of a plurality of multimedia segments in the multimedia content, and a duration of each of the plurality of multimedia segments in the multimedia content. The one or more processors may be further configured to determine a cost function associated with a multimedia segment from the plurality of multimedia segments, based on the count of the plurality of multimedia segments in the multimedia content, and the duration of each of the plurality of multimedia segments in the multimedia content. Further, the one or more processors may determine the cost function based on a first score, and a second score. In an embodiment, the first score may be indicative of a degree of similarity between one or more consecutive multimedia segments of the plurality of multimedia segments. In an embodiment, the first score may be determined by the one or more processors based on a set of similar keywords in the one or more consecutive multimedia segments. In an embodiment, the second score may be indicative of a degree of dissimilarity between the one or more consecutive multimedia segments of the plurality of multimedia segments. In an embodiment, the second score is determined based on a set of dissimilar keywords in the one or more consecutive multimedia segments. The one or more processors may be further configured to determine an updated count of the plurality of multimedia segments, and an updated duration of each of the plurality of multimedia segments until the cost function satisfies a pre-defined criteria. The one or more processors may be further configured to segment the multimedia content into the plurality of multimedia segments based on the updated count of the plurality of multimedia segments, and the updated duration of each of the plurality of multimedia segments.

According to embodiments illustrated herein, a non-transitory computer-readable storage medium having stored thereon, a set of computer-executable instructions for causing a computer comprising one or more processors to perform steps of estimating a count of a plurality of multimedia segments in a multimedia content, and a duration of each of the plurality of multimedia segments in the multimedia content. The one or more processors may further determine a cost function associated with a multimedia segment from the plurality of multimedia segments, based on the count of the plurality of multimedia segments in the multimedia content, and the duration of each of the plurality of multimedia segments in the multimedia content. Further, the one or more processors may determine the cost function based on a first score, and a second score. In an embodiment, the first score may be indicative of a degree of similarity between one or more consecutive multimedia segments of the plurality of multimedia segments. In an embodiment, the first score may be determined by the one or more processors based on a set of similar keywords in the one or more consecutive multimedia segments. In an embodiment, the second score may be indicative of a degree of dissimilarity between the one or more consecutive multimedia segments of the plurality of multimedia segments. In an embodiment, the second score is determined based on a set of dissimilar keywords in the one or more consecutive multimedia segments. The one or more processors may further determine an updated count of the plurality of multimedia segments, and an updated duration of each of the plurality of multimedia segments until the cost function satisfies a pre-defined criteria. Based on the updated count of the plurality of multimedia segments, and the updated duration of each of the plurality of multimedia segments, the one or more processors may segment the multimedia content into the plurality of multimedia segments.

BRIEF DESCRIPTION OF DRAWINGS

The accompanying drawings illustrate the various embodiments of systems, methods, and other aspects of the disclosure. Any person with ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not limit the scope in any manner, wherein similar designations denote similar elements, and in which.

DETAILED DESCRIPTION

Figure 1:
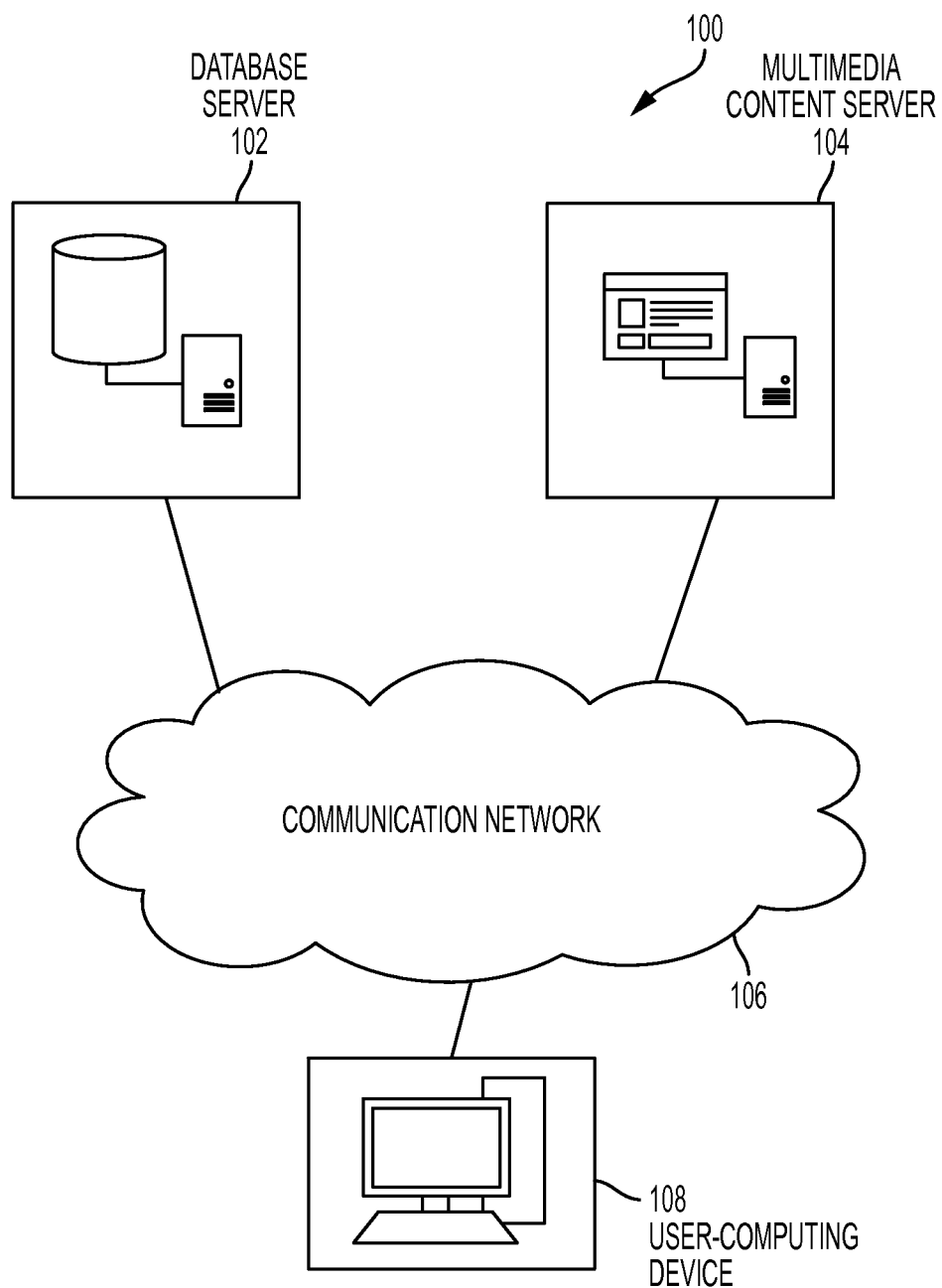
FIG. 1 is a block diagram that illustrates a system environment in which various embodiments of a method and a system may be implemented in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "multimedia content" refers to at least one of, but is not limited to, an audio, a video, a text, an image, a slide deck, and/or an animation. In an embodiment, the multimedia content may be played through a media player such as a VLC Media Player, a Windows Media Player, an Adobe Flash Player, an Apple QuickTime Player, and the like, on a computing device. In an embodiment, the multimedia content may be downloaded or streamed from a multimedia content server to the computing device. In an alternate embodiment, the multimedia content may be stored on a storage device such as a Hard Disk Drive (HDD), a Compact Disk (CD) Drive, a Flash Drive, and the like, connected to (or inbuilt within) the computing device.

A "multimedia segment" corresponds to a portion within a multimedia content that further corresponds to a topic within the multimedia content. Each multimedia segment may have a start time and an end time. In an embodiment, a duration of the multimedia segment within the multimedia content is less than the duration of the multimedia content.

A "plurality of keywords" refers to keywords present in a multimedia content. The plurality of keywords further comprises a set of visual keywords, a set of textual keywords, a set of similar keywords, and a set of dissimilar keywords. In an embodiment, the set of visual keywords corresponds to the keywords that are displayed during playback of the multimedia content. In an embodiment, the set of visual keywords corresponds to the keywords that may be referred to, by a presenter, in the multimedia content to explain/describe a topic. For example, the set of keywords listed in a slide that is displayed during the playback of the multimedia content corresponds to the set of visual keywords. In an embodiment, the set of textual keywords corresponds to the set of keywords present in a subtitle file of the multimedia content. In an embodiment, the set of textual keywords may be obtained from the multimedia content based on one or more speech recognition techniques. In an embodiment, he set of similar keywords corresponds to the keywords that have similar meanings and correspond to a same context within the multimedia content. In an embodiment, the set of dissimilar keywords corresponds to the keywords that have different meanings and correspond to a different context within the multimedia content.

A "saliency score" refers to a score that represents a degree of importance of each keyword in a plurality of keywords (determined from multimedia content). In an embodiment, one or more known techniques are utilized to assign the saliency score to each of the plurality of keywords. Examples of such techniques may include, but are not limited to, a Text Rank technique, a PageRank technique, and the like. In an embodiment, the saliency score associated with each keyword from a set of textual keywords is referred to as a textual saliency score. In an embodiment, the saliency score associated with each keyword from a set of visual keywords is referred to as a visual saliency score.

A "consecutive multimedia segments" refer to a pair of multimedia segments that are chronologically adjacent to each other.

A "first score" refers to a score indicative of a degree of similarity between one or more consecutive multimedia segments in a multimedia content. In an embodiment, the first score is determined based on a set of similar keywords, of a plurality of keywords in the multimedia content, in the one or more consecutive multimedia segments.

A "second score" refers to a score indicative of a degree of dissimilarity between one or more consecutive multimedia segments. In an embodiment, the second score is determined based on a set of dissimilar words in the one or more consecutive multimedia segments.

A "set of partition points" corresponds to a set of time instants in a multimedia content that may represent a change in context of topic being presented in the multimedia content. In an embodiment, the set of partition points may be indicative of a starting timestamp and/or an end timestamp of each of a plurality of multimedia segments in the multimedia content.

A "cost function" refers to a value associated with each of a plurality of multimedia segments in a multimedia content. The cost function is determined based on a first score and a second score. In an embodiment, the cost function associated with each of a plurality of multimedia segments is utilized to determine a set of partition points of each of the plurality of multimedia segments in the multimedia content.

A "set of key phrases" corresponds to one or more combinations of a plurality of keywords in each of a plurality of multimedia segments within a multimedia content. In an embodiment, each key phrase in the set of key phrases may represent the context of subject being presented in the multimedia segment. In an embodiment, the set of key phrases may be determined based on a saliency score associated with each of the plurality of keywords. In an embodiment, the set of key phrases may represent a title associated with each of the multimedia segments within the multimedia content.

A "table of contents" refers to an index that is utilized to navigate through a plurality of multimedia segments within a multimedia content. The table of contents comprises a set of key phrases associated with each of a plurality of multimedia segment in the multimedia content. In an embodiment, the table of contents may associate a set of partition points of each of a plurality of multimedia segments in the multimedia content with the corresponding set of key phrases. In another embodiment, the table of contents may further display a duration associated with each of the plurality of multimedia segments.

FIG. 1 is a block diagram that illustrates a system environment 100 in which various embodiments of a method and a system may be implemented in accordance with at least one embodiment. The system environment 100 may include a database server 102, a multimedia content server 104, a communication network 106, and a user-computing device 108. The database server 102, the multimedia content server 104, and the user-computing device 108 may be communicatively coupled with each other via the communication network 106. In an embodiment, the multimedia content server 104 may communicate with the database server 102 using one or more protocols such as, but are not limited to, Open Database Connectivity (ODBC) protocol and Java Database Connectivity (JDBC) protocol. In an embodiment, the user-computing device 108 may communicate with the multimedia content server 104 via the communication network 106.

In an embodiment, the database server 102 may refer to a computing device that may be configured to store multimedia content. In an embodiment, the database server 102 may include a special purpose operating system specifically configured to perform one or more database operations on the multimedia content. Examples of the one or more database operations may include, but are not limited to, Select, Insert, Update, and Delete. In an embodiment, the database server 102 may be further configured to index the multimedia content. In an embodiment, the database server 102 may include hardware and/or software that may be configured to perform the one or more database operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to retrieve the multimedia content from a plurality of data sources. Examples of the plurality of data sources may include, but are not limited to, social media, blogs, websites, and streaming servers. In an embodiment, an entity may use a computing device to upload the multimedia content to the database server 102. Examples of the entity may include, but are not limited to, an educational institution, an online video streaming service provider, a student, and a professor. The database server 102 may be configured to receive a query from the multimedia content server 104 to obtain the multimedia content. Thereafter, the database server 102 may be configured to transmit the multimedia content to the multimedia content server 104 for segmentation, via the communication network 106.

A person with ordinary skill in the art will understand that the scope of the disclosure is not limited to the database server 102 as a separate entity. In an embodiment, the functionalities of the database server 102 may be integrated into the multimedia content server 104, and vice versa.

In an embodiment, the multimedia content server 104 may refer to a computing device or a software framework hosting an application or a software service. In an embodiment, the multimedia content server 104 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the multimedia content server 104 may be configured to transmit the query to the database server 102 to retrieve the multimedia content. In an embodiment, the multimedia content server 104 may be configured to playback the multimedia content through a media player such as a VLC Media Player, a Windows Media Player, an Adobe Flash Player, an Apple QuickTime Player, and the like. In another embodiment, the multimedia content server 104 may be configured to stream the multimedia content on the user-computing device 108 over the communication network 106. The multimedia content server 104 may be realized through various types of application servers such as, but are not limited to, a Java application server, a .NET framework application server, a Base4 application server, a PHP framework application server, or any other application server framework.

In an embodiment, the multimedia content server 104 may be configured to segment the multimedia content into a plurality of multimedia segments based on a plurality of topics presented in the multimedia content. Further, the multimedia content server 104 may be configured to create a table of contents or an index based on the plurality of topics and the corresponding multimedia segments from the plurality of multimedia segments, in which the plurality of topics has been presented. In an embodiment, the table of contents (created by the multimedia content server 104) may include the plurality of topics covered in the multimedia content and a set of partition points of the corresponding multimedia segments, where a topic from the plurality of topics has been discussed or presented. The operation of the multimedia content server 104 has been discussed later in conjunction with FIG. 2.

In an embodiment, the multimedia content server 104 may be configured to display a user interface on the user-computing device 108. Further, the multimedia content server 104 may be configured to stream the multimedia content on the user-computing device 108 through the user interface. In an embodiment, the multimedia content server 104 may be configured to display the table of contents through the user interface. In an embodiment, the multimedia content server 104 may receive an input from the user-computing device 108, indicative of a selection of the topic from the table of contents. The multimedia content server 104 may stream the multimedia segment corresponding to the topic selected in response to the received input.

A person having ordinary skill in the art will appreciate that the scope of the disclosure is not limited to realizing the multimedia content server 104 and the user-computing device 108 as separate entities. In an embodiment, the multimedia content server 104 may be realized as an application program installed on and/or running on the user-computing device 108 without departing from the scope of the disclosure.

In an embodiment, the communication network 106 may correspond to a communication medium through which the database server 102, the multimedia content server 104, and the user-computing device 108 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 108 may refer to a computing device used by the entity. The user-computing device 108 may comprise one or more processors and one or more memories. The one or more memories may include a computer readable code that may be executable by the one or more processors to perform predetermined operations. In an embodiment, the user-computing device 108 may present the user-interface, received from the multimedia content server 104, to the user to display the table of contents containing a set of key phrases, which may be utilized to navigate through the plurality of multimedia segments in the multimedia content. In an embodiment, the user-computing device 108 may include hardware and/or software to display the table of contents containing the set of key phrases. An example user-interface presented on the user-computing device 108 to display the table of contents have been explained in conjunction with FIG. 6. Examples of the user-computing device 108 may include, but are not limited to, a personal computer, a laptop, a personal digital assistant (PDA), a mobile device, a tablet, or any other computing device.

Figure 2:
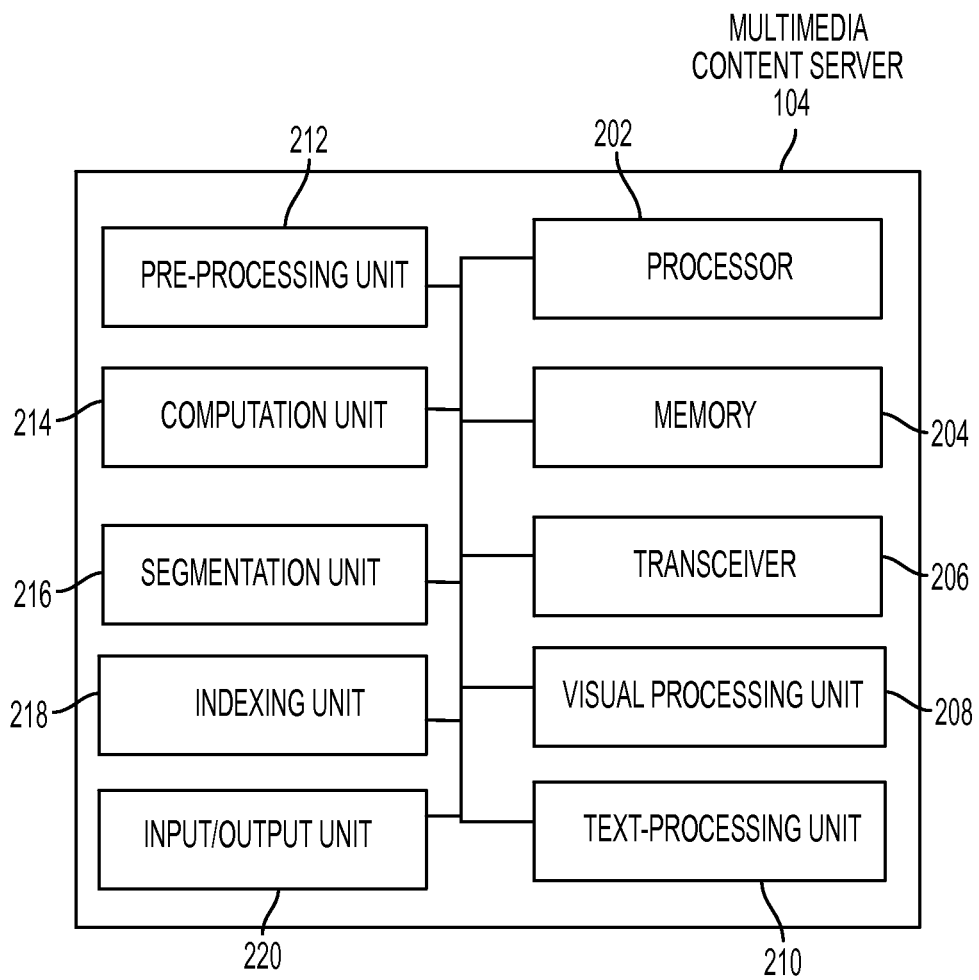
FIG. 2 is a block diagram that illustrates a multimedia content server configured to segment multimedia content in accordance with at least one embodiment.

FIG. 2 is a block diagram that illustrates the multimedia content server 104 configured to segment the multimedia content, in accordance with at least one embodiment. FIG. 2 is explained in conjunction with the elements from FIG. 1.

In an embodiment, the multimedia content server 104 includes a processor 202, a memory 204, a transceiver 206, a visual processing unit 208, a text-processing unit 210, a pre-processing unit 212, a computation unit 214, a segmentation unit 216, an indexing unit 218, and an input/output unit 220. The processor 202 may be communicatively coupled to the memory 204, the transceiver 206, the visual processing unit 208, the text-processing unit 210, the pre-processing unit 212, the computation unit 214, the segmentation unit 216, the indexing unit 218, and the input/output unit 220. The transceiver 206 may be communicatively coupled to the communication network 106.

The processor 202 comprises suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the visual processing unit 208, the text-processing unit 210, the pre-processing unit 212, the computation unit 214, the segmentation unit 216, the indexing unit 218, and the input/output unit 220, to segment the multimedia content. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive the multimedia content from the database server 102, via the communication network 106. The transceiver 206 may be further configured to transmit the user interface to the user-computing device 108, via the communication network 106. Further, the transceiver 206 may be configured to stream the multimedia content to the user-computing device 108 over the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The visual processing unit 208 comprises suitable logic, circuitry, interfaces, and/or code that may be configured to extract a set of visual keywords from the multimedia content. The set of visual keywords may correspond to keywords that may be displayed during playback of the multimedia content. In an embodiment, the visual keywords may correspond to the keywords that may be referred to, by a presenter in the multimedia content to explain/describe a topic. For example, the set of visual keywords may be extracted from text content in a slide, which is being displayed during the playback of the multimedia content. Further, the presenter may refer to the displayed slide to explain/describe the topic. In an embodiment, the visual processing unit 208 may be implemented as an Application-Specific Integrated Circuit (ASIC) microchip designed for a special application, such as to extract the set of visual keywords from the multimedia content based on one or more optical character recognition (OCR) techniques. Examples of OCR techniques may include performing one or more operations, but are not limited to, a de-skewing, a binarization, a line removal, a line and word detection, a script detection, and a character isolation and a segmentation. In an embodiment, the visual processing unit 208 may be configured to extract an image from the multimedia content and compare the image with a stored glyph, in the memory 204, on a pixel-by-pixel basis. Based on the comparison, the visual processing unit 208 may extract the set of visual keywords from the multimedia content. Further, the visual processing unit 208 may determine a visual saliency score associated with each keyword in the set of visual keywords.

The text-processing unit 210 comprises suitable logic, circuitry, interfaces, and/or code that may be configured to perform one or more speech recognition techniques on the multimedia content to extract a set of textual keywords. In an embodiment, the multimedia content may comprise a speech of one or more individuals (e.g., a presenter) describing the plurality of topics. In an embodiment, the text-processing unit 210 may be implemented as an Application-Specific Integrated Circuit (ASIC) microchip designed for a special application, such as to convert the speech to text using one or more speech recognition techniques. Examples of the speech recognition techniques may include, but are not limited to, Dynamic time warping (DTW)-based speech recognition. In an alternate embodiment, the text-processing unit 210 may identify the set of textual keywords from a file containing subtitles of the multimedia content. Further, the text-processing unit 210 may determine a textual saliency score associated with each keyword in the set of textual keywords. In an embodiment, the set of textual keywords and the set of visual keywords constitute the plurality of keywords.

The pre-processing unit 212 comprises suitable logic, circuitry, interfaces, and/or code that may be configured to perform stemming on the plurality of keywords. In an embodiment, stemming may be performed using third party tools such as, Porter Stemmer, Stemka, and the like. In an embodiment, the pre-processing unit 212 may be implemented as an Application-Specific Integrated Circuit (ASIC) microchip designed for a special application, such as to remove stop words comprising conjunctions, prepositions, and the like from the plurality of keywords. In an embodiment, the stop words such as, 'and', 'it', 'the' may be removed from the plurality of keywords. Further, in an embodiment, the pre-processing unit 212 is configured to remove document dependent stop words. In an embodiment, the document dependent stop words may correspond to keywords that may not be useful for segmenting the multimedia content. In an embodiment, the pre-processing unit 212 may determine the document dependent stop words by determining an average and variance of occurrence of each of the plurality of keywords in the multimedia content. In an embodiment, if the average and variance of occurrence of a keyword in the multimedia content is greater than a pre-defined threshold, then the keyword is considered as the document dependent stop word, and thus is removed from the plurality of keywords.

The computation unit 214 comprises suitable logic, circuitry, interfaces, and/or code that may be configured to determine the textual saliency score and the visual saliency score for each of the set of textual keywords and the set of visual keywords, respectively. Further, the computation unit 214 may update the textual saliency score and the visual saliency score for each of the set of text keywords and the set of visual keywords, respectively. In an embodiment, the computation unit 214 may be further configured to determine a first score and a second score for each of the set of textual keywords and the set of visual keywords based on the textual saliency score and the visual saliency score. In an embodiment, the computation unit 214 may be implemented as an Application-Specific Integrated Circuit (ASIC) microchip designed for a special application, such as to determine the first score and the second score.

The segmentation unit 216 comprises suitable logic, circuitry, interfaces, and/or code that may be configured to estimate a count of multimedia segments in the multimedia content. Hereinafter, the multimedia segments estimated by the segmentation unit 216 have been alternatively referred to as the plurality of multimedia segments. Based on the estimated count of multimedia segments, the first score, and the second score, the segmentation unit 216 may determine a cost function associated with each of the plurality of multimedia segments. In an embodiment, the cost function associated with each of the plurality of multimedia segments may be computed iteratively until a pre-defined criteria may be met. In an embodiment, the segmentation unit 216 may be configured to use a dynamic programming approach to determine the cost function. The segmentation unit 216 may be further configured to segment the multimedia content into the plurality of multimedia segments based on the cost function associated with each of the plurality of multimedia segments. In an embodiment, the segmentation unit 216 may be implemented as an Application-Specific Integrated Circuit (ASIC) microchip designed for a special application, such as to determine a set of partition points based on a dynamic programming approach. In an embodiment, the dynamic programming approach may be implemented using one or more programming languages such as, C, C++, C#, Java, and the like.

The indexing unit 218 comprises suitable logic, circuitry, interfaces, and/or code that may be configured to determine a set of key phrases, from the plurality of keywords, which may correspond to each multimedia segment from the plurality of multimedia segments in the multimedia content. The indexing unit 218 may determine the set of key phrases based on the saliency score associated with the plurality of keywords. The saliency score may include the textual saliency score and/or the visual saliency score. In an embodiment, the indexing unit 218 may be implemented as an Application-Specific Integrated Circuit (ASIC) microchip designed for a special application, such as to create a table of contents associated with the multimedia content.

The input/output unit 220 comprises suitable logic, circuitry, interfaces, and/or code that may be configured to receive an input or transmit an output to the user-computing device 108. In an embodiment, the input/output unit 220 may transmit the created table of contents associated with the multimedia content to the user-computing device 108. The input/output unit 220 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 works in coordination with the visual processing unit 208, the text-processing unit 210, the pre-processing unit 212, the computation unit 214, the segmentation unit 216, and the indexing unit 218 to segment the multimedia content. In an embodiment, the multimedia content may correspond to at least a video content, an audio content, or a presentation. In an embodiment, the multimedia content may comprise one or more slides in a pre-defined order or sequence. The presenter in the multimedia content may have described the one or more slides in accordance with sequence or predefined order.

Prior to segmenting the multimedia content, the processor 202 may receive the multimedia content from the database server 102 in response to a transmitted query. In an embodiment, the processor 202 may transmit the query to the database server 102 to extract the multimedia content. In another embodiment, the input/output unit 220 may receive the query from the user-computing device 108 through the transceiver 206. Thereafter, based on the query, the processor 202 may extract the multimedia content from the database server 102.

After extracting the multimedia content, the visual processing unit 208 and the text-processing unit 210 may be configured to extract the set of visual keywords and the set of textual keywords from the multimedia content, respectively.

In an embodiment, the visual processing unit 208 may be configured to determine the set of visual keywords based on OCR operation on the slides, in the multimedia content, to extract the set of visual keywords. In another embodiment, the visual processing unit 208 may be configured to perform the OCR operation on each frame of the multimedia content. For example, if the multimedia content comprises 100 frames, the visual processing unit 208 may be configured to perform the OCR operation in each of the 100 frames. In an embodiment, the set of visual keywords may be associated with each multimedia segment and a time stamp may be associated with each multimedia segment. Thus, the visual processing unit 208 may be configured to determine the set of visual keywords associated with each time stamp. In an embodiment, the following equation may represent the extracted set of visual keywords:

$$W_{S,E}^{vis} = \bigcup_{t_S^{vis}:t_E^{vis}} W_m^{vis} \quad (1)$$

wherein, $W_m^{vis}$ represents a set of visual keywords in the m-th slide in a multimedia content, $W_{S,E}^{vis}$ represents a set of visual keywords in the multimedia segment within time segment $t_{S,E}$, $t_S$ represents a start time of the multimedia segment, and $t_E$ represents an end time of the multimedia segment.

A person with ordinary skill in the art will appreciate that if the multimedia content corresponds to the audio content, the visual processing unit 208 may be non-operational.

In addition, the visual processing unit 208 is further configured to determine the visual saliency score associated with each of the set of visual keywords. In an embodiment, the visual saliency score may correspond to an importance of a keyword in the set of visual keywords. In an embodiment, the visual processing unit 208 may determine the visual saliency score for each keyword in the set of visual keywords based on at least one or more first features associated with each keyword in the set of visual keywords. In an embodiment, the one or more first features may correspond to one or more of, but are not limited to, underline, highlight, bold, italics, and the like. For instance, the presenter in the multimedia content may have underlined a keyword to emphasize the importance of the keyword. Such underlining of the keyword may correspond to a first feature. Similarly, the presenter may have highlighted, bolded, or italicized the keywords to emphasize the importance of the keyword. Such visual means for emphasizing on the importance of the keywords may constitute the one or more first features.

Based on the determined one or more first features, the visual processing unit 208 may be configured to compute the visual saliency score. In an embodiment, the visual processing unit 208 may assign a predetermined weightage to each of the one or more first features, based on which the visual processing unit 208 may determine the visual saliency score. In an embodiment, the visual processing unit 208 may utilize one or more known techniques such as, but are not limited to, a font size of the keyword, a color of the keyword, and a relative location of the keyword in a frame to determine the visual saliency score.

For example, a slide in the multimedia content contains ten words. Using one or more OCR techniques, the visual processing unit 208 may extract the ten words. Further, the visual processing unit 208 identifies that out of the ten words, four words are highlighted and bolded. Thus, the visual processing unit 208 may assign a higher visual saliency score to the four keywords as compared to the remaining keywords.

In an embodiment, the text-processing unit 210 may be configured to employ a speech to text conversion technique to convert the speech in the multimedia content to text sentences or phrases. In an embodiment, the text sentences or phrases obtained from the text-processing unit 210 comprises the set of textual keywords. For example, if a presenter in the multimedia content speaks a phrase such as, "New Delhi is the capital of India". Thus, the set of textual keywords includes "New Delhi", "capital", "India".

In an alternate embodiment, the text-processing unit 210 may use a subtitle file of the multimedia content server 104 to retrieve the set of textual keywords. In an embodiment, the subtitle file may contain the text sentences or phrases that are spoken during the playback of the multimedia content. The text-processing unit 210 may be configured to extract the set of textual keywords from the subtitle file associated with the multimedia content. Example file formats of the subtitle file may include, but are not limited to, .srt, .sub, and .sbv. In an embodiment, a script or a third party Application Programming Interface (API) may be utilized to extract the set of textual keywords from the subtitle file. In an embodiment, the set of textual keywords may be associated with each multimedia segment and a time stamp may be associated with each multimedia segment. In an embodiment, following equation may represent the set of textual keywords extracted from the multimedia content:

$$W_{S,E}^{text} = \cup_{t_S \cdot t_E} W_n^{text} \qquad (2)$$

wherein, $W_n^{text}$ represents the set of textual keywords in the nth sentence in the multimedia content, and $W_{S,E}^{text}$ represents the set of textual keywords in the multimedia segment within time segment $t_{S,E}$.

After extracting the set of textual keywords, the pre-processing unit 212 removes the stop words from the set of textual keywords. In an embodiment, one or more keywords from the set of textual keywords that correspond to conjunctions, prepositions, and the like are removed from the set of textual keywords. Further, in an embodiment, the pre-processing unit 212 is configured to remove the document dependent stop words. The document dependent stop words may correspond to the one or more keywords from the set of textual keywords that may have high number occurrences in the text obtained from the text-processing unit 210. The text-processing unit 210 may determine the document dependent stop words based on a comparison of occurrence of each keyword in the set of textual keywords with a pre-defined threshold.

For example, the text-processing unit 210 may determine that the set of textual keywords comprises the following keywords:

TABLE 1

Textual keywords and corresponding number of occurrences

| Textual keywords | Number of occurrences |
|---|---|
| Quantization | 100 |
| Signal | 5000 |
| Video | 600 |

Table 1 illustrates that the keyword "quantization" occurs 100 times in the multimedia content. Similarly, the text-processing unit 210 determines that the keywords "signal" and "video" occur 5000 times and 600 times in the multimedia content, respectively. The text-processing unit 210 may be configured to compare the number of occurrences with a predetermined threshold value. Let the predetermined threshold value be 1000. Thus, the text-processing unit 210 determines that the term "signal" exceeds the predetermined threshold. Thus, the text-processing unit 210 may identify the term "signal" as the document dependent stop word. Further, the text-processing unit 210 may remove the term "signal" from the set of textual keywords.

In an embodiment, the pre-processing unit 212 may be further configured to remove stop words and the document dependent stop words from the set of visual keywords before the computation of the visual saliency score. However, a person with ordinary skill in the art will appreciate that the removal of the stop words and the document dependent stop words from the set of visual keywords may be optional.

In an embodiment, the text-processing unit 210 may be configured to determine the textual saliency score for each keyword in the set of textual keywords. In an embodiment, the textual saliency score may correspond to an importance of a keyword in the set of textual keywords. In an embodiment, the text-processing unit 210 may determine the textual saliency score for each of the set of textual keywords based on at least one or more second features associated with each of the set of textual keywords in the multimedia content. In an embodiment, the one or more second features may correspond to one or more of, but are not limited to, a duration of utterance associated with each keyword in the multimedia content, and the number of occurrences of each keyword in the set of textual keywords. A person having ordinary skill in the art will appreciate that a presenter in the multimedia content may increase a duration of utterance associated with a keyword to emphasize the importance of the keyword. Therefore, such keyword may be of importance.

Based on the determined one or more second features, the text-processing unit 210 may be configured to determine the textual saliency score. In an embodiment, the text-processing unit 210 may assign a pre-determined weightage to each of the one or more second features, based on which the text-processing unit 210 may determine the textual saliency score for each keyword in the set of textual keywords.

For example, when a speech to text conversion technique is utilized to extract the set of textual keywords, the text-processing unit 210 may also determine a duration of utterance associated with each keyword from the set of textual keywords and/or a number of occurrences of each keyword in the set of textual keywords. Consider that the speech to text conversion technique provides keywords such as, "New Delhi", "capital", and "India". Further, the duration of utterance of the keyword "capital" is 1.5 seconds and the number of occurrences of the keyword "capital" is 20. Thus, based on the duration of utterance of the keyword and the number of occurrences of the keyword, the text-processing unit 210 assigns a higher textual saliency score to the keyword "capital" as compared to the remaining keywords (e.g. "New Delhi", and "India").

In an embodiment, the text-processing unit 212 may use one or more known techniques such as, a relative frequency of the keyword in a subtitle file, a relative frequency of the keyword in the subtitle file as compared to the keyword's frequency in a corpus of multiple documents, and a co-occurrence of keyword patterns of the keyword to determine the text-saliency score for each keyword in the set of textual keywords.

After extraction of the set of textual keywords and the set of visual keywords, the text-processing unit 210 may be further configured to filter the set of textual keywords to determine a subset of textual keywords. The text-processing unit 210 may be configured to determine the subset of textual keywords based on a comparison of the set of textual keywords with the set of visual keywords. For example, one or more first textual keywords in the set of textual keywords that are not present in the set of visual keywords may be discarded by the text-processing unit 210. Further, one or more second textual keywords in the set of textual keywords that are present in the set of visual keywords are considered for further processing and may constitute the subset of textual keywords. Therefore, there is high likelihood that the keywords in the subset of textual keywords may correspond to visual keywords extracted from the multimedia content (e.g., keywords extracted from the one or more slides being displayed in the multimedia content).

For example, the set of textual keywords comprises of the keywords, "capital", "New Delhi", "India", "Maharashtra", and "Mumbai". Further, the set of visual keywords comprises of the keywords, "capital", "Mumbai", "Maharashtra", "Bengaluru", "Karnataka", "Tamil Nadu", "Chennai". Thus, the text-processing unit 210 may be configured to discard the keywords "New Delhi", and "India" from the set of textual keywords that may be utilized for further processing. Thus, the subset of textual keywords after filtering comprises of the keywords "Maharashtra", "Mumbai", and "capital".

In an embodiment, the subset of textual keywords and the set of visual keywords constitute the plurality of keywords. Let the subset of textual keywords and the set of visual keywords be denoted by $W_{s,e}$. In an embodiment, the computation unit 214 is configured to sort the plurality of keywords in accordance to the saliency score (e.g., the textual saliency score and the visual saliency score) associated with each of the plurality of keywords (the subset of textual keywords and the set of visual keywords). As discussed above, both the set of visual keywords and the subset of textual keywords have the associated saliency score, therefore, the computation unit 214 may sort the plurality of keywords $W_{s,e}$ in accordance to the saliency score. Further, the computation unit 214 may be configured to update the saliency score of each of the plurality of keywords based on at least a position of the keywords in the sorted list of the plurality of keywords. Further, the computation unit 214 may be configured to update the saliency score associated with the plurality of keywords based on following equation.

$$s_p = z^i s_p \qquad (3)$$

wherein, $s_p$ is the saliency score associated with the p-th keyword such that $w_p \in W_{s,e}$, i is the location of the p-th keyword in the sorted list, and z is a weighting factor. In an embodiment, the value of z is set to 0.9 (determined based on experiments).

A person skilled in the art will understand that the scope of the disclosure should not be limited to the updating the saliency score based on the aforementioned factors and using the aforementioned techniques. Further, the examples provided in supra are for illustrative purposes and should not be construed to limit the scope of the disclosure.

In an embodiment, the segmentation unit 216 may be configured to estimate the count of multimedia segments in the multimedia content. In an embodiment, the segmentation unit 216 may be further configured to estimate the set of partition points of each of the estimated multimedia segments. Let the estimated count of multimedia segments in the multimedia content be k, where k may be a variable. Let the set of partition points be represented in accordance with equation (4).

$$\tau^{opt} = \{t_{m1}, t_{m2}, \ldots, t_{mk}\}, \text{ where } t_{mk} \in \tau^{vis} \forall k \qquad (4)$$

For example, the multimedia segment is 1 hour long. The segmentation unit 216 may estimate that the multimedia content has two segments (k=2) with a partition point at 30 minutes. Therefore, the starting timestamp of the first multimedia segment is 0 seconds and ending timestamp of the first multimedia segment is 30 minutes. Further, the starting timestamp of the second multimedia segment is 30 minutes and the ending timestamp of the second multimedia segment is 60 minutes.

After estimating the count of multimedia segments and the set of partition points, the first score may be determined by the computation unit 214 for the consecutive multimedia segments denoted by $S_{m_{k-1}, m_k}$ and $S_{m_k, m_{k+1}}$. The first score denoted by $C(S_{m_{k-1}, m_k}, S_{m_k, m_{k+1}})$ may be representative of the degree of similarity between two consecutive multimedia segments and may be determined in accordance with equation (5).

$$\text{First score} = \text{first factor} + \text{second factor} \qquad (5)$$

wherein, $$\text{first factor} = \frac{\sum_{w_p \in w_{m_{k-1}, m_k} \cap w_{m_k, m_{k+1}}} s_p}{\sum_{w_p \in w_{m_{k-1}, m_k}} s_p}, \text{ and}$$

$$\text{second factor} = \frac{\sum_{w_p \in w_{m_{k-1}, m_k} \cap w_{m_k, m_{k+1}}} s_p}{\sum_{w_p \in w_{m_k, m_{k+1}}} s_p}$$

In an embodiment, referring to equation 5, the first score is determined based on a sum of a first factor and a second factor. The first factor in equation (5) denotes a summation of the saliency scores of the plurality of keywords that are common in the consecutive multimedia segments $S_{m_{k-1}, m_k}$, and $S_{m_k, m_{k+1}}$, normalized by the summation of saliency scores of the plurality of keywords present in the multimedia segment $S_{m_{k-1}, m_k}$. The second factor of equation (5) denotes the summation of the saliency scores of the plurality of keywords that are common between the consecutive multimedia segments $S_{m_{k-1}, m_k}$, and $S_{m_k, m_{k+1}}$, normalized by the summation of saliency scores of the plurality of keywords present in $S_{m_k, m_{k+1}}$. In an embodiment, the set of visual keywords and the subset of textual keywords may be associated with each multimedia segment and a time stamp may be associated with each multimedia segment. Further, the saliency score of the set of visual keywords and the subset of textual keywords may be utilized to determine the first score.

A person skilled in the art will understand that the scope of the disclosure should not be limited to capturing the degree of similarity of keywords between the two consecutive multimedia segments based on the aforementioned factors and using the aforementioned techniques. Further, the examples provided in supra are for illustrative purposes and should not be construed to limit the scope of the disclosure.

After determination of the first score, the computation unit 214 determines the second score for the consecutive multimedia segments denoted by $S_{m_{k-1}, m_k}$, and $S_{m_k, m_{k+1}}$. The second score denoted by $D(S_{m_{k-1}, m_k}, S_{m_k, m_{k+1}})$ may capture the degree of dissimilarity of dissimilar keywords between two consecutive multimedia segments and may be determined in accordance with equation (6).

$$\text{Second score} = \text{third factor} + \text{fourth factor} \qquad (6)$$

wherein, $$\text{third factor} = \frac{\sum_{w_p \in w_{m_{k-1}, m_k} \setminus w_{m_k, m_{k+1}}} s_p}{\sum_{w_p \in w_{m_{k-1}, m_k}} s_p}, \text{ and}$$

$$\text{fourth factor} = \frac{\sum_{w_p \in w_{m_k, m_{k+1}} \setminus w_{m_{k-1}, m_k}} s_p}{\sum_{w_p \in w_{m_k, m_{k+1}}} s_p}$$

In an embodiment, referring to equation 6, the second score is determined based on a sum of a third factor and a fourth factor. The third factor in equation (6) denotes a summation of the saliency scores of the plurality of keywords that are present in multimedia segment $S_{m_{k-1}, m_k}$ but are not present in multimedia segment $S_{m_k, m_{k+1}}$. Further, the third factor may be normalized by the summation of saliency scores of the plurality of keywords present in the multimedia segment $S_{m_{k-1}, m_k}$. The fourth factor in equation (6) denotes the summation of the saliency scores of the plurality of keywords that are present in multimedia segment $S_{m_{k-1}, m_k}$ but are not present in multimedia segment $S_{m_k, m_{k+1}}$. Further, the fourth factor may be normalized by the summation of saliency scores of the plurality of keywords present in $S_{m_k, m_{k+1}}$. In an embodiment, the set of visual keywords and the subset of textual keywords may be associated with each multimedia segment and a time stamp may be associated with each multimedia segment. Further, the saliency score of the set of visual keywords and the subset of textual keywords may be utilized to determine the second score.

A person skilled in the art will understand that the scope of the disclosure should not be limited to capturing the degree of dissimilarity of dissimilar keywords between two consecutive multimedia segments based on the aforementioned factors and using the aforementioned techniques. Further, the examples provided in supra are for illustrative purposes and should not be construed to limit the scope of the disclosure.

Based on the first score and the second score, the segmentation unit 216 may be configured to determine the cost function associated with each multimedia segment from the multimedia content. The cost function associated with each multimedia segment may be utilized to determine the set of partition points within the multimedia content. In an embodiment, the set of partition points represents a change in context of a topic being presented in the multimedia content. In an embodiment, the set of partition points may be indicative of a starting timestamp and/or an end timestamp of each of a plurality of multimedia segments in the multimedia content. Let the number of partition points in the multimedia content be k, where k may be a variable. Let the set of partition points be represented in accordance with equation 7.

$$\tau^{opt} = \{t_{m_1}, t_{m_2}, \ldots, t_{m_k}\}, \text{ where } t_{m_k} \in \tau^{vis} \forall k \tag{7}$$

In an embodiment, the cost function associated with each multimedia segment may be determined in accordance with equation (8).

$$\tau^{opt} = \underset{\tau^{vis}}{\operatorname{argmin}} \ \Sigma_{k=1}^{k} \begin{pmatrix} \alpha.C(S_{m_{k-1},m_k}, S_{m_k,m_{k+1}}) - \\ (1-\alpha).D(S_{m_{k-1},m_k}, S_{m_k,m_{k+1}}) \end{pmatrix} \tag{8}$$

where,

α denotes a weighting factor associated with each parameter in the cost function, $S_{m_{k-1}, m_k}$ denotes the multimedia segment between the time instant $t_{m_{k-1}}, t_{m_k}$, $S_{m_k, m_{k+1}}$ denotes the multimedia segment between the time instant $t_{m_k}, t_{m_{k+1}}$, $C(S_{m_{k-1}, m_k}, S_{m_k, m_{k+1}})$ denotes the first score, and $D(S_{m_{k-1}, m_k}, S_{m_k, m_{k+1}})$ denotes the second score.

A person skilled in the art will understand that the scope of the disclosure should not be limited to determining the cost function based on the aforementioned factors and using the aforementioned techniques. Further, the examples provided in supra are for illustrative purposes and should not be construed to limit the scope of the disclosure.

To segment the multimedia content based on the cost function, a dynamic programming approach may be implemented to determine the set of partition points within the multimedia content. The set of partition points are determined such that the each time instant of the set of partition points corresponds to the start time or the end time of the multimedia segments. Let the number of partition points in the multimedia content denoted by k varies in the range:

$$\frac{|\tau|}{t_{max}} - 1 \leq k \leq \frac{|\tau|}{t_{min}} - 1,$$

where |τ| denotes the number of time instants in the education video. Further, $t_{min}$ and $t_{max}$ denote the minimum and maximum possible number of instants considered for each context in the multimedia content.

The segmentation unit 216 may be configured to determine the set of partition points based on the dynamic programming approach. Let Cost(t) denote the cost function and Seg(t) denote the set of partition points of the multimedia content till the t-th time instant. Cost(t) may be determined in accordance with equation (9) and Seg(t) may be determined in accordance with equation (10)

$$Cost(t) = \min_{u \in [t_{min}, t_{max}]} \begin{bmatrix} Cost(t-u) + \\ \alpha.C(S_{Seg_{(t-u)}, t-u}, S_{t-u,t}) - \\ (1-\alpha).D(S_{Seg_{(t-u)}, t-u}, S_{t-u,t}) \end{bmatrix} \tag{9}$$

$$Seg(t) = \underset{u \in [t_{min}, t_{max}]}{\operatorname{argmin}} \begin{bmatrix} Cost(t-u) + \\ \alpha.C(S_{Seg_{(t-u)}, t-u}, S_{t-u,t}) - \\ (1-\alpha).D(S_{Seg_{(t-u)}, t-u}, S_{t-u,t}) \end{bmatrix} \tag{10}$$

The segmentation unit 216 may be configured to implement the dynamic programming approach to determine the set of partition points in the multimedia content until the pre-defined criteria is met. The segmentation unit 216 may initialize Cost(t)=∞, t∈τ, and Seg(t)=1, t∈τ. In an embodiment, the segmentation unit 216 may be configured to determine an updated count of the estimated count of multimedia segments in the multimedia segments and an updated duration of the plurality of multimedia segments. Based on the dynamic programming approach, the value of Cost(t) and Seg(t) varies until $\tau^{opt} \subseteq \tau^{vis}$ and the value of Cost(t) may be set greater than a pre-defined threshold such that Cost(t), $\forall t \notin \tau^{vis}$. The pre-defined criteria corresponds to the value of Cost(t) that may be set greater than the pre-defined threshold such that Cost(t), $\forall t \notin \tau^{vis}$. In an embodiment, the complexity of the dynamic programming approach is $O((t_{max} - t_{min})|\tau^{vis}|)$.

A person skilled in the art will understand that the scope of the disclosure should not be limited to segmenting the multimedia content (e.g. an educational video) based on the aforementioned factors and using the aforementioned techniques. Further, the examples provided in supra are for illustrative purposes and should not be construed to limit the scope of the disclosure.

Subsequently, the indexing unit 218 may be configured to determine the table of contents associated with the multimedia content (e.g., education video). In order to determine the table of contents, the indexing unit 218 may be configured to associate each partition point from the set of partition points with the set of key phrases. Each partition point represents the starting time instant associated with multimedia segment. In order to determine the set of key phrases associated with each partition point, the visual processing unit 208 may be configured to determine the subset of visual keywords from the set of visual keywords based on the visual saliency score associated with each keyword in set of visual keywords. In an embodiment, the subset of visual keywords may include titles or headings from the one or more slides present in the multimedia segment.

After determining the subset of visual keywords from the set of visual keywords, the text-processing unit 210 may be configured to determine the subset of textual keywords associated with the multimedia segment in the multimedia content for which the set of key phrases is to be determined. In response to the determination of the subset of textual keywords and the subset of visual keywords, the indexing unit 218 may be configured to determine the set of key phrases associated with a partition point corresponding to each of plurality of multimedia segments from the multimedia content. In an embodiment, the set of key phrases may correspond to one or more combinations of the subset of textual keywords and the subset of visual keywords. In an embodiment, the selection of keywords from the subset of textual keywords and the subset of visual keywords may be based on the saliency score of the subset of textual keywords and the subset of visual keywords. The indexing unit 218 may be configured to compare the saliency score associated with the subset of textual keywords and the subset of visual keywords with a pre-defined threshold to determine the set of key phrases.

The indexing unit 218 may be configured to determine the set of key phrases associated with each partition point from the set of partition points. Thus, for each multimedia segment in the multimedia content, the set of key phrases associated with each partition point from the set of partition points may be determined. Based on the determined set of key phrases, the indexing unit 218 may be configured to create the table of contents associated with the multimedia content. In an embodiment, the transceiver 206 transmits the table of contents to the user-computing device 108 for displaying on the display screen of the user-computing device 108. In an embodiment, the user may perform an input operation on the set of key phrases in order to navigate to the corresponding time instant (partition point) in the multimedia content. In an embodiment, in response to the input operation on the set of key phrases, the user-computing device 108 may be configured to display one or more frames, related to the set of key phrases, from the multimedia content. The user interfaces displayed on the display screen on the user-computing device 108 are explained later in conjunction with FIG. 6.

A person skilled in the art will understand that the scope of the disclosure should not be limited to creating the table of contents associated with the multimedia content based on the aforementioned factors and using the aforementioned techniques. Further, the examples provided in supra are for illustrative purposes and should not be construed to limit the scope of the disclosure.

Figure 3:
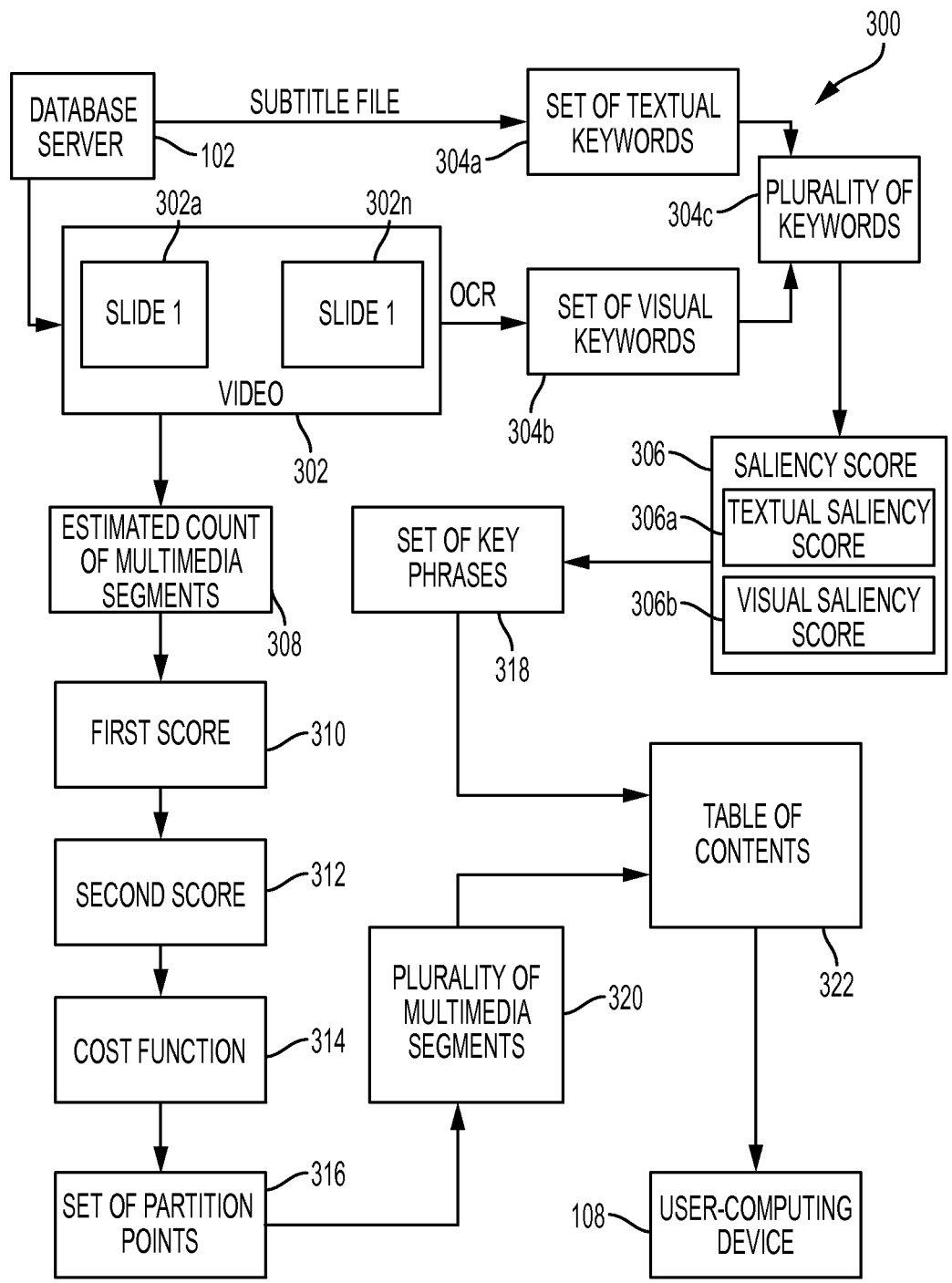
FIG. 3 is a block diagram that illustrates an exemplary scenario to segment the multimedia content and create a table of contents associated with the multimedia content in accordance with at least one embodiment.

FIG. 3 is a block diagram that illustrates an exemplary scenario to segment the multimedia content (e.g. educational video) and create the table of contents associated with the multimedia content, in accordance with at least one embodiment. The FIG. 3 is described in conjunction with FIG. 1 and FIG. 2.

With reference to FIG. 3, an educational video (denoted by 302) may be retrieved by the multimedia content server 104 from the database server 102, via the communication network 106. The educational video 302 may comprise a plurality of slides (denoted by 302a, 302b, . . . , 302n). In an embodiment, the subtitle file (denoted by 303) associated with the educational video (denoted by 302) may be retrieved from the database server 102. After retrieving the educational video (denoted by 302) and the subtitle file (denoted by 303), the text-processing unit 210 may be configured to extract the set of textual keywords (denoted by 304a) from the subtitle file (denoted by 303). Further, the visual processing unit 208 may be configured to extract the set of visual keywords (denoted by 304b) by performing one or more OCR operations on the plurality of slides (denoted by 302a, 302b, . . . , 302n). The set of textual keywords 304a and the set of visual keywords 304b when combined together may represent the plurality of keywords (denoted by 304c).

After extracting the plurality of keywords 304c, the saliency score (denoted by 306) may be determined for each keyword from the plurality of keywords 304c. In an embodiment, the text-processing unit 210 may be configured to determine the textual saliency score (denoted by 306a) associated with each keyword from the set of textual keywords 304a. In an embodiment, the visual processing unit 208 may be configured to determine the visual saliency score (denoted by 306b) associated with each keyword from the set of visual keywords 304b.

After assigning the saliency score (denoted by 306) to the plurality of keywords 304c, the segmentation unit 216 may be configured to estimate the count of video segments (denoted by 308) that correspond to different contexts in the educational video 302. In response to the estimation of the count of multimedia segments (denoted by 308), the computation unit 214 may be configured to determine the first score (denoted by 310) that may be indicative of the degree of similarity of the set of similar keywords between one or more consecutive multimedia segments in the educational video 302. Further, the computation unit 214 may be configured to determine the second score (denoted by 312) that may be indicative of the degree of dissimilarity of the set of dissimilar keywords between the one or more consecutive multimedia segments in the educational video 302.

Based on the determined first score, second score, and the estimated count of the plurality of multimedia segments, the segmentation unit 216 may be configured to determine the cost function (denoted by 314) until the pre-defined criteria may be met. In an embodiment, the segmentation unit 216 may implement the dynamic programming approach to determine the cost function 314 until the pre-defined criteria may be met. The segmentation unit 216 may be configured to utilize the cost function 314 to determine the set of partition points (denoted by 316). In an embodiment, the set of partition points 316 may correspond to the time instants within the educational video 302 that correspond to a change of context within the educational video 302. Based on the determined set of partition points 316, the educational video 302 may be segmented into the plurality of multimedia segments (denoted by 320) such that each multimedia segment from the plurality of multimedia segments (denoted by 320) may represent a context different from the other plurality of multimedia segments (denoted by 320).

After determining the plurality of multimedia segments (denoted by 320), the indexing unit 218 may be configured to determine the set of key phrases (318) based on the saliency score 306 associated with each keyword from the plurality of keywords 304c. In an embodiment, the set of key phrases 318 may correspond to one or more combinations of the plurality of keywords 304c. In response to determination of the set of key phrases and the plurality of multimedia segments (denoted by 320), the indexing unit 218 may be configured to create the table of contents (denoted by 322). The table of contents displays the set of key phrases 318 and each key phrase from the set of key phrases may be associated with the set of partition points (denoted by 316). In an embodiment, after the creation of the table of contents 322, the transceiver 206 may transmit the table of contents 322 to the user-computing device 108. The user may utilize the table of contents 322 to navigate through the educational video 302. The user interfaces displayed on the display screen on the user-computing device 108 are explained later in conjunction with FIG. 6.

A person skilled in the art will understand that the scope of the disclosure should not be limited to segmenting the educational video and creating the table of contents associated with the educational video based on the aforementioned factors and using the aforementioned techniques. Further, the examples provided in supra are for illustrative purposes and should not be construed to limit the scope of the disclosure.

Figure 4:
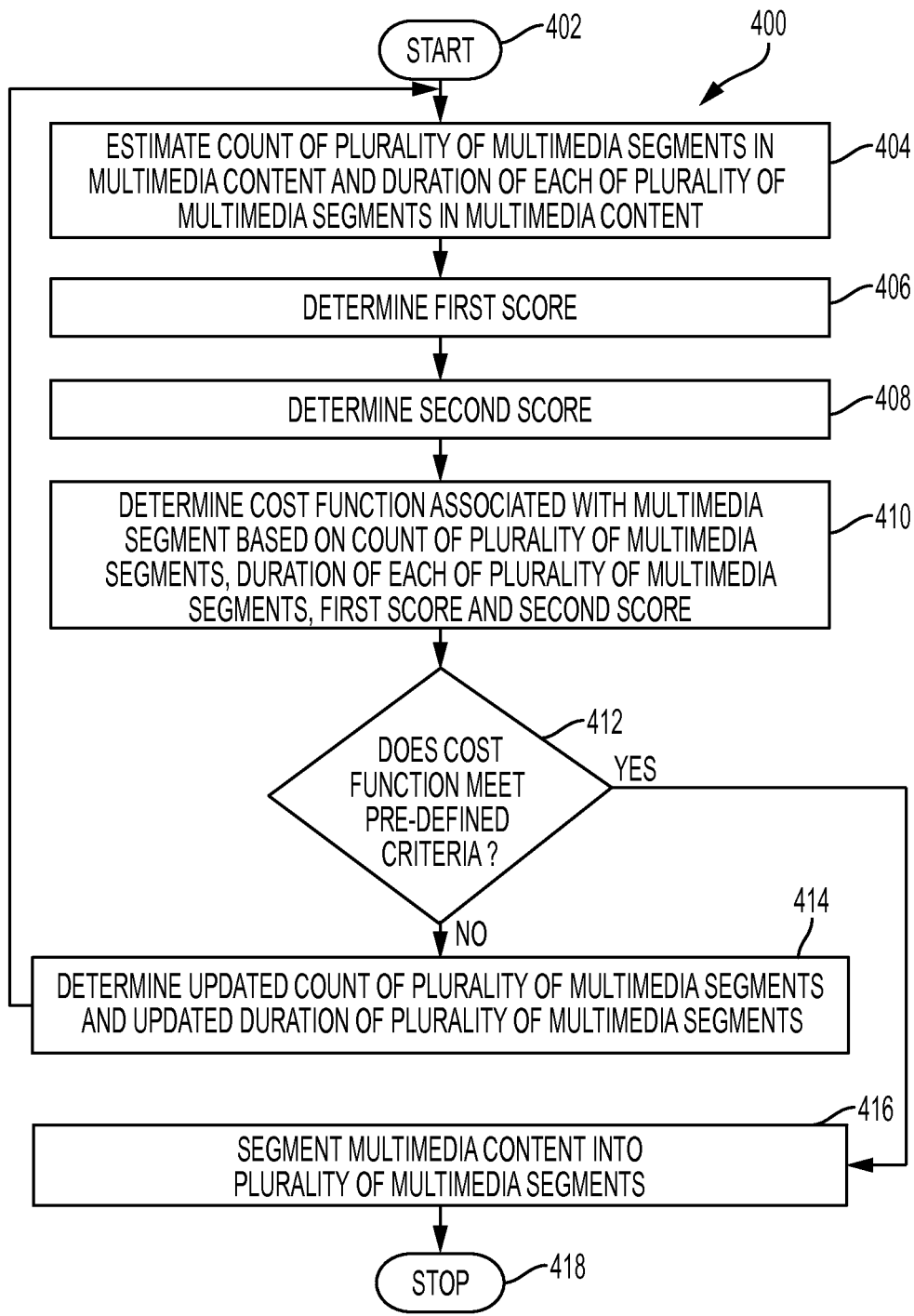
FIG. 4 is a flowchart that illustrates a method to segment the multimedia content in accordance with at least one embodiment.

FIG. 4 is a flowchart 400 that illustrates a method to segment the multimedia content, in accordance with at least one embodiment. The flowchart 400 is described in conjunction with FIG. 1 and FIG. 2. The method starts at step 402.

At step 404, the segmentation unit 216 may be configured to estimate the count of the plurality of multimedia segments in the multimedia content and the duration of each of the plurality of multimedia segments in the multimedia content. At step 406, the computation unit 214 may be configured to determine the first score indicative of the degree of similarity of the set of similar keywords between one or more consecutive multimedia segments. At step 408, the computation unit 214 may be configured to determine the second score indicative of the degree of dissimilarity of the set of dissimilar keywords between the one or more consecutive segments. At step 410, the segmentation unit 216 may be configured to determine the cost function based on the count of the plurality of multimedia segments, the duration of each of the plurality of multimedia segments in the multimedia content, the first score, and the second score.

At step 412, the segmentation unit 216 may be configured to determine whether the cost function meets the pre-defined criteria. If the cost function meets the pre-defined criteria, control passes to step 416. If the cost function does not meet the pre-defined criteria, control passes to step 414. At step 414, the segmentation unit 216 may be configured to determine an updated count of the plurality of multimedia segments and an updated duration of the plurality multimedia segment. Control passes to step 404. At step 416, the segmentation unit 216 may be configured to segment the multimedia content into plurality of multimedia segments based on the updated count of the plurality of multimedia segments, and the updated duration of each of the plurality of multimedia segments. Control passes to end step 418.

Figure 5A:
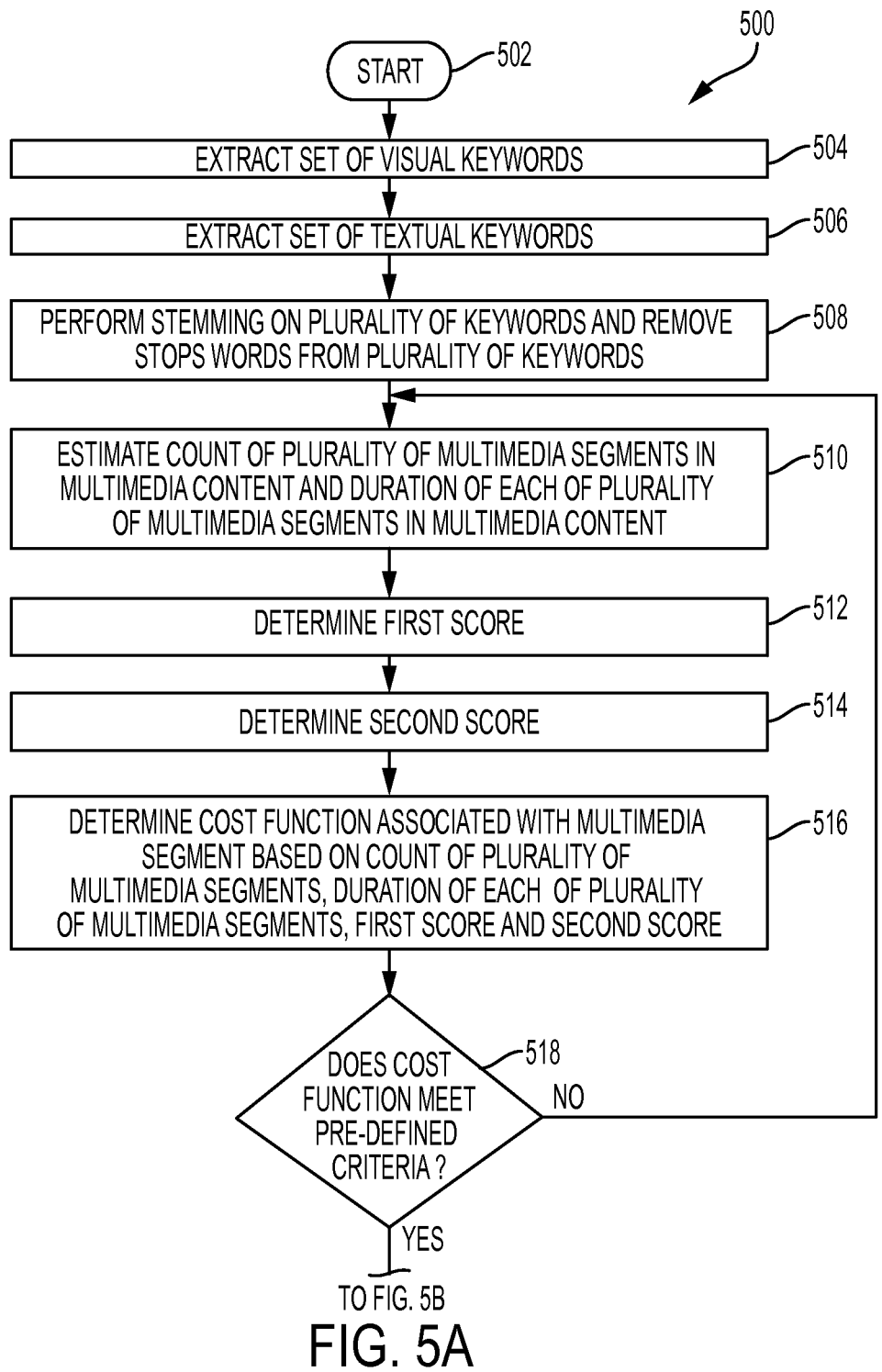
FIG. 5A, and FIG. 5B are flowcharts that illustrates a method to create the table of contents associated with the multimedia content in accordance with at least one embodiment.
Figure 5B:
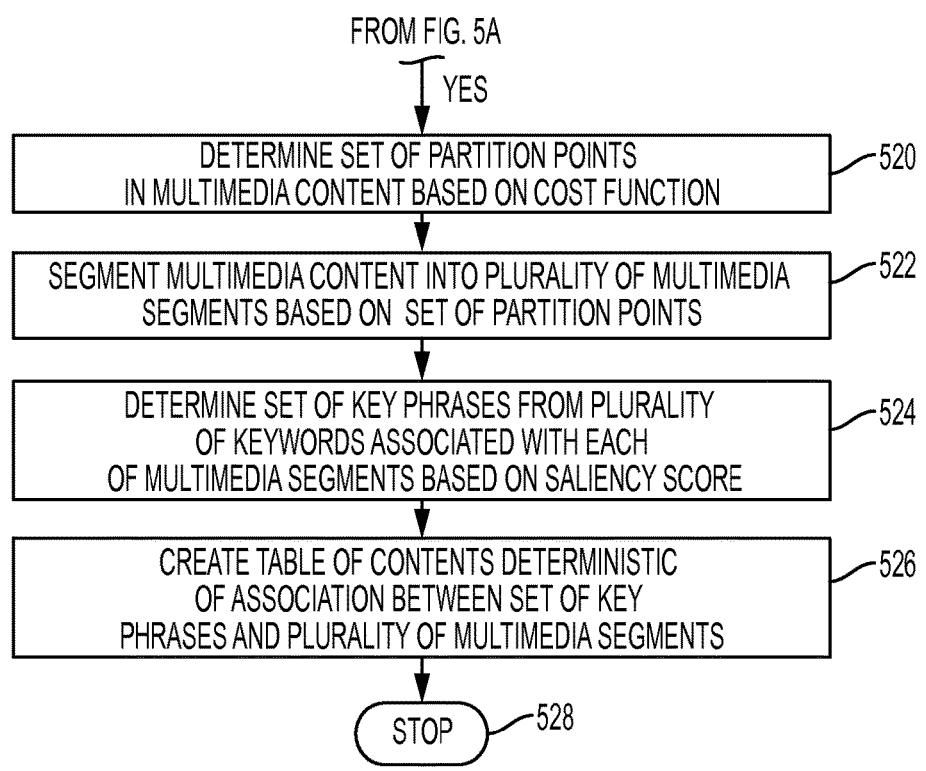

FIG. 5A, and FIG. 5B is a flowchart 500 that illustrates a method to create the table of contents associated with the multimedia content in accordance with at least one embodiment. The flowchart 500 is described in conjunction with FIG. 1 and FIG. 2.

The method starts at step 502. At step 504, the visual processing unit 208 may be configured to extract the set of visual keywords from the multimedia content. At step 506, the text-processing unit 210 may be configured to perform speech recognition techniques on the multimedia content to extract the set of textual keywords from the multimedia content. At step 508, the pre-processing unit 212 may be configured to perform stemming on the plurality of keywords and remove stops words from the plurality of keywords. At step 510, the segmentation unit 216 may be configured to estimate the count of the plurality of multimedia segments in the multimedia content and the duration of each of the plurality of multimedia segments in the multimedia content.

At step 512, the computation unit 214 may be configured to determine the first score indicative of the degree of similarity of the set of similar keywords between one or more consecutive multimedia segments. At step 514, the computation unit 214 may be configured to determine the second score indicative of the degree of dissimilarity of the set of dissimilar keywords between the one or more consecutive multimedia segments.

At step 516, the segmentation unit 216 may be configured to determine the cost function, based on the count of plurality of multimedia segments, the duration of each of plurality of multimedia segments, the first score, and the second score. At step 518, the segmentation unit 216 may determine if the pre-defined criteria is met. If the pre-defined criteria is met, then the control of the method passes to step 520. If the pre-defined criteria is not met, then the control of the method passes to step 510. At step 520, the segmentation unit 216 may be configured to determine the set of partition points in the multimedia content based on the cost function. At step 522, the segmentation unit 216 may be configured to segment the multimedia content into the plurality of multimedia segments based on the set of partition points.

At step 524, the indexing unit 218 may be configured to determine the set of key phrases from the plurality of keywords associated with each of the multimedia segment based on the saliency score associated with each of the plurality of keywords. At step 526, the indexing unit 218 may be configured to create the table of contents deterministic of association between the set of key phrases and the plurality of multimedia segments. Control passes to end step 528.

Figure 6:
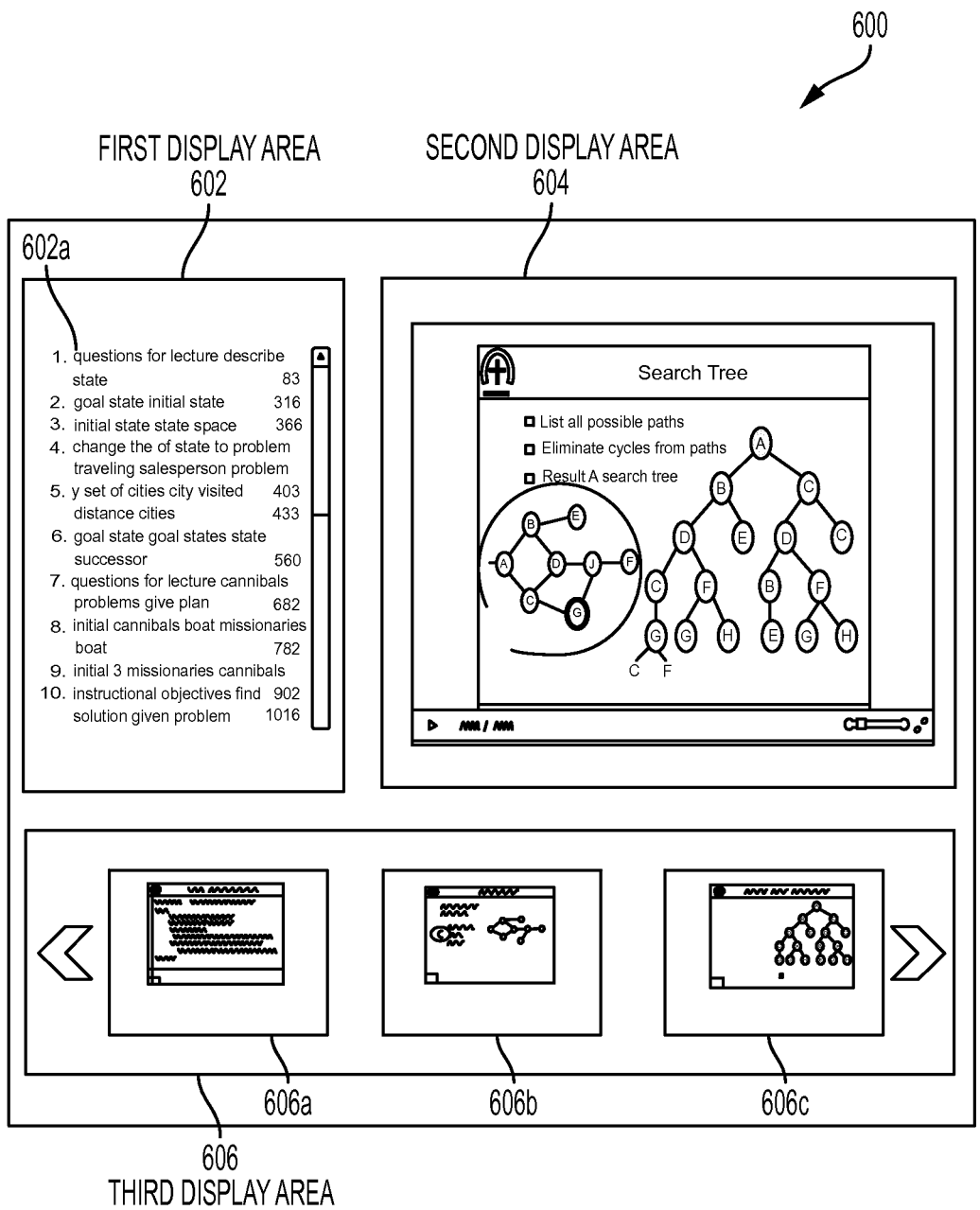
FIG. 6 illustrates an example user-interface presented on a user-computing device to display the table of contents in accordance with at least one embodiment.

FIG. 6 illustrates an example user-interface 600 presented on the user-computing device 108 to display the table of contents, in accordance with at least one embodiment.

The user-interface 600 comprises a first display area 602, a second display area 604, and a third display area 606. The first display area 602 displays the table of contents, associated with the multimedia content, generated by the indexing unit 218. The table of contents displays the set of key phrases associated with each multimedia segment in the multimedia content. In an embodiment, the table of contents may also display the duration of each multimedia segment in the first display area 602. In an embodiment, a hyperlink may be associated with each of the set of key phrases. When an input operation may be performed on a set of key phrase 602a, the user may be directed to the associated multimedia segment, which may be then displayed in the second display area 604.

The second display area 604 displays the multimedia content. In an embodiment, the second display area 604 may contain command buttons such as, play, rewind, forward, pause in order to control playback of the multimedia content. In an embodiment, the second display area 604 may also provide command buttons to increase, decrease, and mute the audio associated with the multimedia content. In an embodiment, a seek bar may be displayed on the second display area 604 that enables the user to navigate through the multimedia content. In another embodiment, one or more icons may be displayed on the seek bar where each icon corresponds to the set of partition points associated with each multimedia segment. In an embodiment, during playback of the multimedia content, the second display area 604 may display the duration of the multimedia content.

The third display area 606 displays one or more related key frames from the multimedia content that are associated with each of the multimedia segments in the multimedia content. In an embodiment, when the user performs an input operation on the set of key phrase 602a, the associated key frames 606a, 606b, and 606c may be displayed in the third display area 606. In an embodiment, if the number of associated key frames with the set of key phrase may be more than then area of the third display area 606, then a scroll bar may be provided to the user so that the user may scroll and view the key frames associated with the set of key phrase.

A person skilled in the art will understand that the user-interface 600 is described herein for illustrative purposes and should not be construed to limit the scope of the disclosure.

In another implementation of the disclosed method and the system, a summary associated with each of the plurality of multimedia segments may be created based on the set of textual keywords and then set of visual keywords associated with each of the plurality of multimedia segments. In an embodiment, a summary creation unit (not shown) may be configured to create the summary associated with the multimedia segment based on the saliency scores, the first score, and the second score. The summary creation unit may be configured to select the set of textual keywords and the set of visual keywords that have the saliency score greater than a pre-defined threshold. The summary unit may be configured to create one or more contextual sentences based on the selected set of textual keywords and set of visual keywords to create the summary associated with a multimedia segment from the multimedia content. In an embodiment, the summary unit may be configured to combine the summaries associated with each of the multimedia segments from the multimedia content to generate the summary of the multimedia content.

In another implementation of the disclosed method and the system, the set of key phrases may be utilized to create a tag cloud that may be associated with multimedia content. The tag cloud displays the different contexts associated with the plurality of multimedia segments in the multimedia content. In an embodiment, the font size of the set of key phrases associated with a multimedia segment may vary based on the saliency score of the plurality of keywords and the duration of the segment. In an embodiment, the user may perform an input operation on one of the displayed set of phrases in tag cloud. In response to the input operation, the user may be navigated to the multimedia segment that corresponds to the set of phrases. Further, in an embodiment, a search interface may be provided to the user to search the multimedia content based on a set of keywords input by the user. The processor 202 may be configured to compare the set of keywords input by the user with the set of key phrases associated with each content. Based on the comparison, the processor 202 may display a set of relevant multimedia segments to the user.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to segment the multimedia content. The at least one code section in an multimedia content server 104 causes the machine and/or computer comprising one or more processors to perform the steps, which comprises estimating a count of a plurality of multimedia segments in a multimedia content, and a duration of each of the plurality of multimedia segments in the multimedia content. A cost function associated with a multimedia segment from the plurality of multimedia segments may be determined based on the count of the plurality of multimedia segments and the duration of each of the plurality of multimedia segments. The cost function may be determined based on a first score indicative of the degree of similarity of a set of similar keywords between one or more consecutive multimedia segments, and a second score indicative of a degree of dissimilarity of a set of dissimilar keywords between the one or more consecutive multimedia segments. An updated count of the plurality of multimedia segments and an updated duration of each of the plurality of multimedia segments may be determined until the cost function satisfies a pre-defined criteria. Based on the updated count of the plurality of multimedia segments, and the updated duration of each of the plurality of multimedia segments, the multimedia content may be segmented into the plurality of multimedia segments.

Various embodiments of the disclosure encompass numerous advantages including methods and systems for segmenting the multimedia content. In an embodiment, the methods and systems may be utilized to create the table of contents associated with the multimedia content. The methods and systems enables the user to navigate through the multimedia content using the table of contents. Further, based on the table of contents, the user may be able to understand the context associated with multimedia segment in the multimedia content. In an embodiment, the methods and systems provides the user interface that displays one or more related key frames, associated with each multimedia segment in the multimedia content, to the user. The one or more related key frames are displayed along with the table of contents and thus the user may understand the context of each multimedia segment in a better manner.

The present disclosure may be realized in hardware, or in a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A multimedia content server configured to segment multimedia content, comprising:
one or more processors; and
memory comprising a set of instructions, wherein
the set of instructions, with the one or more processors, are configured to
  extract a set of visual keywords and a set of textual keywords from the multimedia content,
  estimate a count of a plurality of multimedia segments in the multimedia content, and
  segment the multimedia content into the plurality of multimedia segments based on a cost function associated with each of the plurality of multimedia segments, wherein
  the cost function is determined based on the estimated count, a first score, and a second score, and is computed iteratively until a predefined criteria is met, wherein
the extraction of the set of visual keywords is represented by $$W_{S,E}^{vis} = \cup_{t_S:t_E}^{vis} W_m^{vis}$$

where $W_m^{vis}$ represents a set of visual keywords in the m-th slide in the multimedia content,
$W_{S,E}^{vis}$ represents the set of visual keywords in the multimedia segment within time segment $t_{S,E}$,
$t_S$ represents a start time of the multimedia segment, and
$t_E$ represents at end time of the multimedia segment.

2. The multimedia content server of claim 1, wherein the set of instructions, with the one or more processors, are further configured to
extract an image from the multimedia content and compare the image with a stored glyph on a pixel-by-pixel basis,
extract the set of visual of visual keywords from the multimedia content based on the comparing of the image with a stored glyph on the pixel-by-pixel basis, and
determine a visual saliency score associated with each keyword in the set of visual keywords.

3. The multimedia content server of claim 2, wherein the set of instructions, with the one or more processors, are further configured to
determine a textual saliency score associated with each keyword in the set of textual keywords.

4. The multimedia content server of claim 3, wherein each keyword comprises the set of visual keywords and the set of textual keywords.

5. The multimedia content server of claim 4, wherein the set of instructions, with the one or more processors, are further configured to determine a set of key phrases from each keyword, wherein each keyword corresponds to one media segment in the plurality of multimedia segments.

6. The multimedia content server of claim 1, wherein the extraction of the set of textual keywords is represented by $$W_{S,E}^{text} = \cup_{t_S:t_E} W_n^{text}$$

$W_n^{text}$ represents a set of textual keywords in the nth sentence in the multimedia content, and,
$W_{S,E}^{text}$ represents the set of textual keywords in the multimedia segment within time segment $t_{S,E}$.

7. The multimedia content server of claim 6, wherein the set of instructions, with the one or more processors, are further configured to remove one or more stop words and document dependent stop words from the set of textual keywords,
the one or more stop words correspond to conjunctions, prepositions, or both, and
the one or more document dependent stop words correspond to one or more keywords from the set of textual keywords that have a high number of occurrences.

8. The multimedia content server of claim 1, wherein the set of instructions, with the one or more processors, are further configured to remove one or more stop words and one or more document dependent stop words from the set of visual keywords prior to computing a visual saliency score.

9. The multimedia content server of claim 1, wherein the set of instructions, with the one or more processors, are further configured to
compare the set of textual keywords with the set of visual keywords to determine a subset of textual keywords,
the determination of the subset of textual keywords filters the set of textual keywords.

10. The multimedia content server of claim 9, wherein the set of instructions, with the one or more processors, are further configured to sort the plurality of keywords in accordance with a saliency score associated with each of the plurality of keywords,
the saliency score comprises a textual saliency score and a visual saliency score, and
the plurality of keywords comprises the subset of textual keywords and the set of visual keywords.

11. The multimedia content server of claim 10, wherein the set of instructions, with the one or more processors, are further configured to update the saliency score of each of the plurality of keywords based on at least a position of the keywords in a sorted list of the plurality of keywords.

12. The multimedia content server of claim 11, wherein the update of the saliency score is represented by $$s_p = z^i s_p$$

where $s_p$ is the saliency score associated with p-th keyword such that $W_p \in W_{s,e}$,
$W_{s,e}$ denotes the subset of textual keywords and the set of visual keywords,
i is a location of the p-th keyword in the sorted list, and
z is a weighting factor.

13. The multimedia content server of claim 11, wherein, when estimating the count of the multimedia segments, the set of instructions, with the one or more processors, are further configured to
estimate a set of partition points of each of the estimated count of the multimedia segments as defined by $$\tau^{opt} = \{t_{m1}, t_{m2}, \ldots, t_{mk}\},$$

where $$t_{mk} \in \tau^{vis} \forall k$$

where k is the estimated count of the multimedia segments in the multimedia content.

14. The multimedia content server of claim 13, wherein the set of instructions, with the one or more processors, are further configured to determine the first score for consecutive multimedia segments, the consecutive multimedia segments are denoted by $S_{m_{k-1},m_k}$, and $S_{m_k,m_{k+1}}$ and the first score is denoted by $C(S_{m_{k-1},m_k}, S_{m_k,m_{k+1}})$ representative of the degree of similarity between two consecutive multimedia segments and determined by First score=first factor+second factor where the first factor denotes a summation of a saliency score of the plurality of keywords common in the consecutive multimedia segments $S_{m_{k-1},m_k}$ and $S_{m_k,m_{k+1}}$ normalized by the summation of the saliency scores of the plurality of keywords present in the multimedia segment $S_{m_{k-1},m_k}$, and where the second factor denotes a summation of the saliency score of the plurality of keywords that are common between the consecutive multimedia segments $S_{m_{k-1},m_k}$ and $S_{m_k,m_{k+1}}$ normalized by the summation of the saliency scores of the plurality of keywords present in the multimedia segment $S_{m_k,m_{k+1}}$.

15. The multimedia content server of claim 14, wherein the set of instructions, with the one or more processors, are further configured to determine the second score for the consecutive multimedia segments, the consecutive multimedia segments are denoted by $S_{m_{k-1},m_k}$ and $S_{m_k,m_{k+1}}$ and the second score is denoted by $D(S_{m_{k-1},m_k}, S_{m_k,m_{k+1}})$ is configured to capture the degree of dissimilarity of dissimilar words between two consecutive multimedia segments and determined by Second score=third factor+fourth factor where the third factor denotes a summation of a saliency score of the plurality of keywords that are present in the multimedia segment $S_{m_{k-1},m_k}$ but are not present in the multimedia segment $S_{m_k,m_{k+1}}$, the third factor being normalized by the summation of the saliency scores of the plurality of keywords present in the multimedia segment $S_{m_{k-1},m_k}$, and where the fourth factor denotes a summation of the saliency score of the plurality of keywords that are present in the multimedia segment $S_{m_{k-1},m_k}$ but are not present in the multimedia segment $S_{m_k,m_{k+1}}$, the fourth factor being normalized by the summation of the saliency scores of the plurality keywords present in the multimedia segment $S_{m_k,m_{k+1}}$.

16. The multimedia content server of claim 1, wherein the cost function is determined by $$\tau^{opt} = \operatorname*{argmin}_{\tau^{vis}} \sum_{k=1}^{k} (\alpha, C(S_{m_{k-1},m_k}, S_{m_k,m_{k+1}}) - (1-\alpha) \cdot D(S_{m_{k-1},m_k}, S_{m_k,m_{k+1}}))$$

where α denotes weighting factor associated with each parameter in the cost function, $S_{m_{k-1},m_k}$ denotes a multimedia segment between the time instant $t_{m_{k-1}}, t_{m_k}$, $S_{m_k,m_{k+1}}$ denotes a multimedia segment between the time instant $t_{m_k}, t_{m_{k+1}}$, $C(S_{m_{k-1},m_k}, S_{m_k,m_{k+1}})$ denotes the first score, and $D(S_{m_{k-1},m_k}, S_{m_k,m_{k+1}})$ denotes the second score.

17. The multimedia content server of claim 1, wherein the set of instructions, with the one or more processors, are further configured to determine a set of partition points in the multimedia content based on the cost function, segment the multimedia content into the plurality of multimedia segments based on the set of partition points, determine a set of key phrases from the plurality of keywords associated with each of the multimedia segment based on a saliency score associated with each of the plurality of keywords, and create a table of contents deterministic of association between the set of key phrases and the plurality of multimedia segments.

18. A multimedia content server configured to segment multimedia content, comprising:

one or more processors; and memory comprising a set of instructions, wherein the set of instructions, with the one or more processors, are configured to extract a set of visual keywords and a set of textual keywords from the multimedia content, estimate a count of a plurality of multimedia segments in the multimedia content, and segment the multimedia content into the plurality of multimedia segments based on a cost function associated with each of the plurality of multimedia segments, wherein the cost function is determined based on the estimated count, a first score, and a second score, and is computed iteratively until a predefined criteria is met, wherein the cost function is determined by $$\tau^{opt} = \operatorname*{argmin}_{\tau^{vis}} \sum_{k=1}^{k} (\alpha, C(S_{m_{k-1},m_k}, S_{m_k,m_{k+1}}) - (1-\alpha) \cdot D(S_{m_{k-1},m_k}, S_{m_k,m_{k+1}}))$$

where α denotes weighting factor associated with each parameter in the cost function, $S_{m_{k-1},m_k}$ denotes a multimedia segment between the time instant $t_{m_{k-1}}, t_{m_k}$, $S_{m_k,m_{k+1}}$ denotes a multimedia segment between the time instant $t_{m_k}, t_{m_{k+1}}$, $C(S_{m_{k-1},m_k}, S_{m_k,m_{k+1}})$ denotes the first score, and $D(S_{m_{k-1},m_k}, S_{m_k,m_{k+1}})$ denotes the second score.

* * * * *